United States Patent
Tomita et al.

[11] Patent Number: 6,142,730
[45] Date of Patent: Nov. 7, 2000

[54] GAS TURBINE COOLING STATIONARY BLADE

[75] Inventors: Yasuoki Tomita; Kenichi Arase; Hiroki Fukuno; Hideki Murata; Kiyoshi Suenaga; Tsuyoshi Kitamura, all of Hyogo-ken, Japan

[73] Assignee: Mitsubishi Heavy Industries, Ltd., Tokyo, Japan

[21] Appl. No.: 09/202,690
[22] PCT Filed: Apr. 28, 1998
[86] PCT No.: PCT/JP98/01959
  § 371 Date: Dec. 21, 1998
  § 102(e) Date: Dec. 21, 1998
[87] PCT Pub. No.: WO98/50685
  PCT Pub. Date: Nov. 12, 1998

[30] Foreign Application Priority Data
May 1, 1997 [JP] Japan ................................. 9-113842

[51] Int. Cl.⁷ ................................. F01D 9/04; F01D 9/06
[52] U.S. Cl. ........................... 415/115; 415/114; 415/116
[58] Field of Search ................................. 415/114, 115, 415/116, 117; 416/96 R, 96 A, 97 R; 60/39.75

[56] References Cited

U.S. PATENT DOCUMENTS

| | | | |
|---|---|---|---|
| 3,628,880 | 12/1971 | Smuland et al. | 415/115 |
| 4,353,679 | 10/1982 | Hauser | 415/115 |
| 4,946,346 | 8/1990 | Ito | 415/115 |
| 5,120,192 | 6/1992 | Ohtomo et al. | 415/115 |
| 5,320,483 | 6/1994 | Cunha et al. | 415/114 |
| 5,320,485 | 6/1994 | Bourguignon et al. | 415/115 |
| 5,413,458 | 5/1995 | Calderbank | 415/115 |
| 5,464,322 | 11/1995 | Cunha et al. | 415/115 |
| 5,488,825 | 2/1996 | Davis et al. | 415/115 |
| 5,611,662 | 3/1997 | Cunha | 415/115 |
| 5,634,766 | 6/1997 | Cunha et al. | 415/115 |
| 5,639,216 | 6/1997 | McLaurin et al. | 416/96 R |
| 5,827,043 | 10/1998 | Fukuda et al. | 415/115 |
| 5,829,245 | 11/1998 | McQuiggan et al. | 415/115 |
| 5,848,876 | 12/1998 | Tomita | 416/96 R |
| 5,954,475 | 9/1999 | Matsuura et al. | 415/115 |
| 5,980,202 | 11/1999 | Tomita et al. | 415/115 |
| 5,997,245 | 12/1999 | Tomita et al. | 415/115 |

FOREIGN PATENT DOCUMENTS

| | | |
|---|---|---|
| 3-115702 | 5/1991 | Japan . |
| 4-311604 | 11/1992 | Japan . |
| 5-65802 | 3/1993 | Japan . |
| 6-93801 | 4/1994 | Japan . |
| 6-257405 | 9/1994 | Japan . |
| 8-177406 | 7/1996 | Japan . |

*Primary Examiner*—Christopher Verdier
*Attorney, Agent, or Firm*—Sughrue, Mion, Zinn, Macpeak & Seas, PLLC

[57] ABSTRACT

In a cooled gas turbine stationary blade, both steam cooling and air cooling are utilized to reduce the amount of cooling air. In the stationary blade having outer and inner shrouds 1, 21 and steam passages 10A, 10B, 10C, 10D and 10E which are communicated with each other and in which a sealing air feed tube 2 passes through a central portion thereof, steam covers 3, 4 are provided in the outer shroud 1, and steam S is introduced from a steam feed port 5. The steam S passes through serpentine passages 10A to 10E and is recovered from the steam outlet 12 after cooling the central portion of the outer shroud 1 by means of an impingement plate 8. A portion of the steam of the passage 10A is introduced from the impingement plate 25 to a steam sump 24 to cool the central portion of the inner shroud 21 and pass through the passage 10D to be recovered from the steam outlet port 12. On the other hand, cooling air is fed from cooling air feed ports 6 and 26 to peripheral portions of the outer and inner shrouds 1, 21, and is discharged to the outside from the rear sides thereof, respectively, and the cooling air is further fed from a cooling air feeding port 7 to the passage 10E on the rear edge of the blade to cool the rear edge of the blade. Only the narrow portions where it is difficult for the steam to pass are air-cooled to thereby reduce the amount of the cooling air.

7 Claims, 6 Drawing Sheets

GAS TURBINE COOLING STATIONARY BLADE

BACKGROUND OF THE INVENTION

1. Technical Field of the Invention

The present invention relates to a cooled stationary blade for a gas turbine, and more particularly to a cooled stationary blade for a cooled blade type gas turbine using both steam cooling and air cooling.

2. Description of the Related Art

Currently, the cooling of stationary blades of a gas turbine is performed by air, which consumes a large amount of cooling air. Consequently, a large amount of cooling air is fed to the blades and a large amount of cooling air leaks out resulting in a degradation of performance of the gas turbine. A typical conventional air cooling system for the gas turbine stationary blades will now be described.

Figure 5:
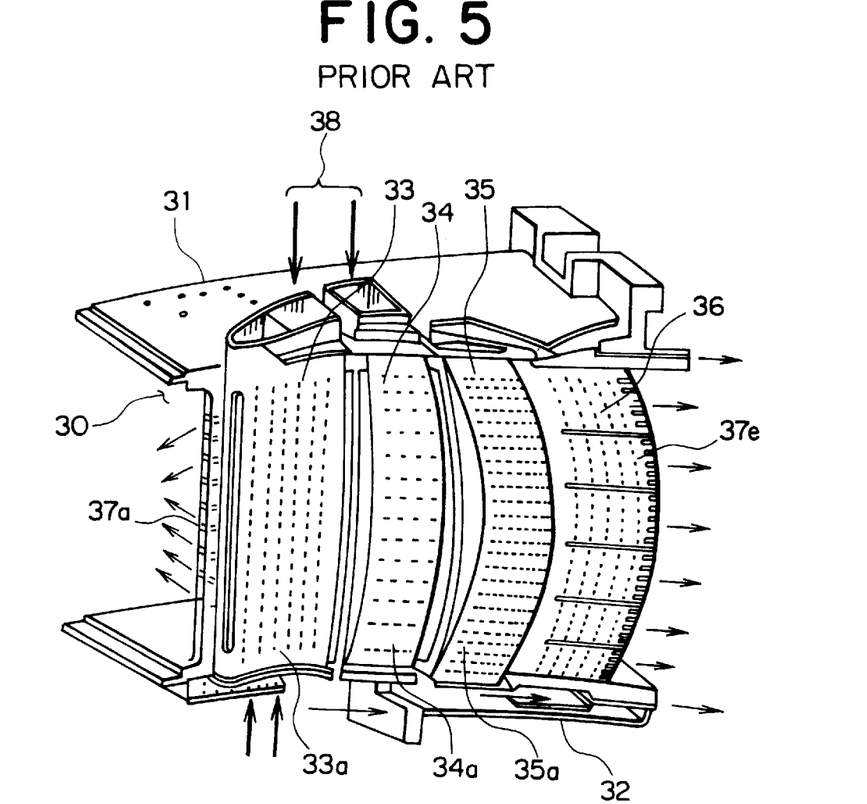
FIG. 5 is a perspective view showing a conventional cooled stationary blade.
Figure 6:
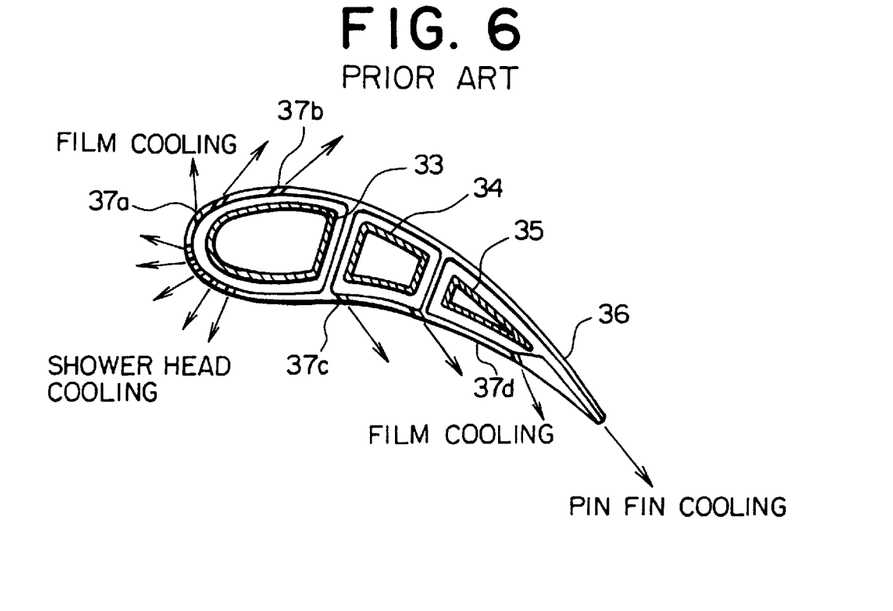
FIG. 6 is a cross-sectional view showing a conventional cooled stationary blade shown in FIG. 5.

FIG. 5 shows an example of inserts in a gas turbine stationary blade. FIG. 6 is a cross-sectional view thereof. In both drawings, reference numeral 30 denotes the overall stationary blade, numeral 31 denotes an outer shroud and numeral 32 denotes an inner shroud. Numerals 33, 34 and 35 denote inserts in the stationary blade whose interior is divided into three sections. Numeral 36 denotes a rear edge fin. The stationary blade is composed of the outer shroud, the inner shroud, the insert and the rear edge fin.

High pressure air 38 is fed from the outer shroud 31 into each insert 33, 34 and 35. The high pressure cooling air is injected toward the blade from a number of cooling air holes 33a, 34a and 35a formed in each insert 33, 34 and 35 to thereby impingement cool the inner surface of the blade. Afterwards, the cooling air is injected to the outside of the blade from cooling air holes 37a, 37b, 37c and 37d provided in the blade surface. Shower head cooling, film cooling and pin fin cooling are performed at the front edge portion of the blade, the back and front portions of the blade and the rear edge fin 36 portion, respectively.

Figure 7:
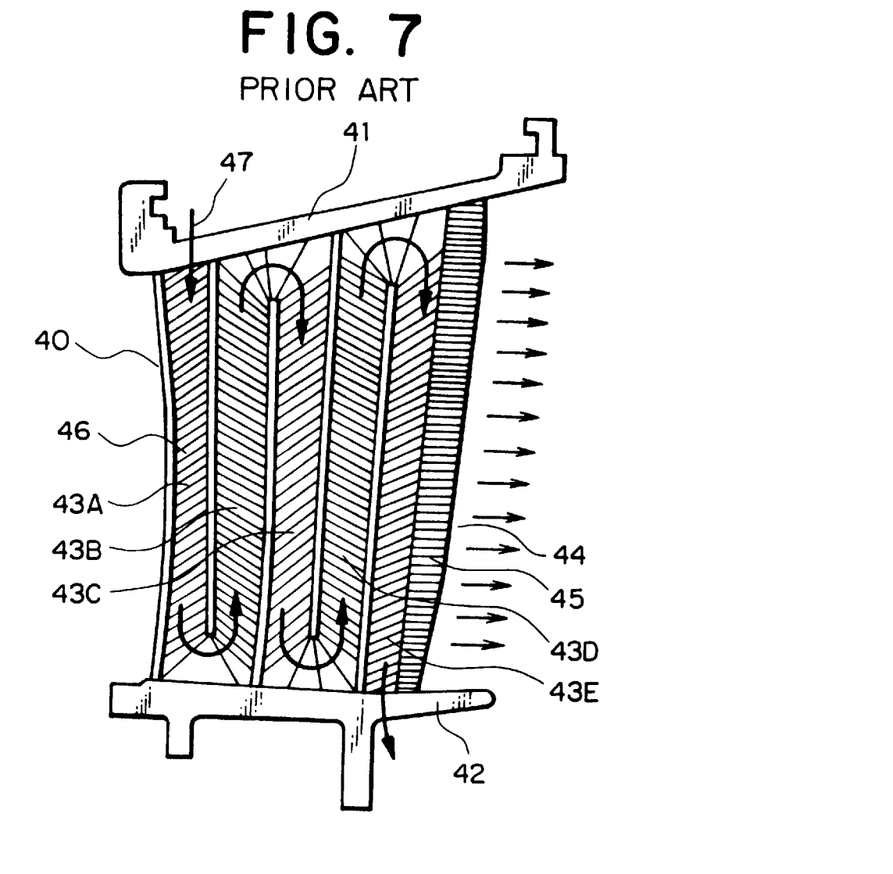
FIG. 7 is a longitudinal sectional view showing another type of conventional cooled stationary blade.
Figure 8:
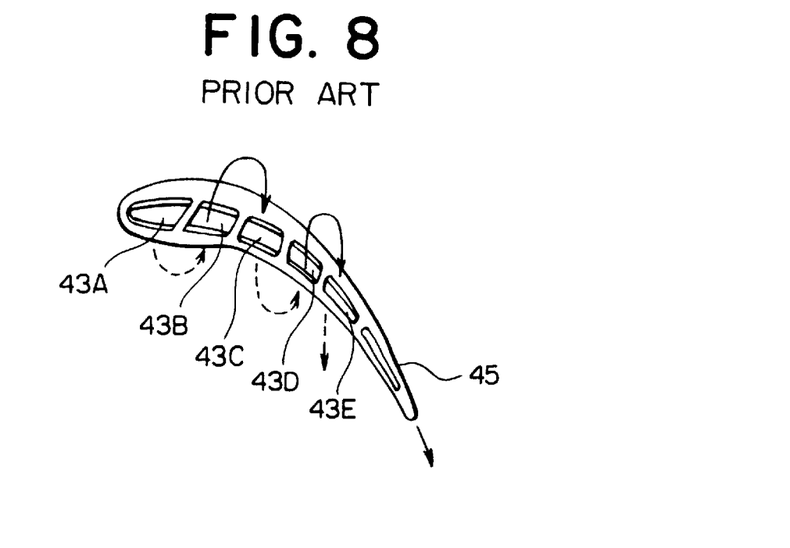
FIG. 8 is a cross-sectional view showing the conventional cooled stationary blade shown in FIG. 7.

FIG. 7 shows a cooling system in another conventional gas turbine stationary blade. FIG. 8 is a cross-sectional view thereof. Numeral 40 denotes the overall stationary blade, numeral 41 denotes an outer shroud and numeral 42 denotes an inner shroud. In the interior of the blade, air passages 43A, 43B, 43C, 43D and 43E are communicated with each other at upper and lower portions thereof to form a serpentine cooling path. Numeral 45 denotes a fin provided at a rear edge. A number of air cooling holes 44 for blowing the cooling air out from the passage 43E are provided. Numeral 46 denotes a number of turbulators provided in the interior of each of the air passages 43A to 43E for enhancing heat transmission.

The cooling air 47 is fed from the upper portion of the air passage 43A located at the front edge of the outer shroud 41 and flows to the lower portion thereof, to enter the air passage 43B, flows upwardly in the passage 43B, enters the passage 43C from the upper portion of the air passage 43B, and flows in the passages 43D and 43E in a similar manner to cool the blade by means of the respective passages. The air after cooling flows out of the blade from the cooling air holes 44 of the rear edge fin 45 and the rest of the air flows out of the blade from the lower portion of the air passage 43E.

As is apparent from the above-described examples shown in FIGS. 5 to 8, a large amount of cooling air is required to cool the stationary blade in the conventional gas turbine. Currently, a large amount of power is also required for a compressor or a cooler.

As described above, in the conventional gas turbine stationary blade, a large amount of cooling air always flows through the blade for cooling, and an amount of air is required to seal the blade in order to prevent the high temperature combustion gas from being introduced into the interior of the blade from the gas passage. Consequently, a relatively large amount of power is consumed by the compressor or the cooler in order to keep the air at a high pressure. Thus, the conventional system suffers from a problem in that the performance of the gas turbine is degraded.

Also, recently, a combined cycle for enhancing power generating efficiency by combining a gas turbine and a steam turbine has been realized. A variety of publications disclose that, instead of using air to cool the blade, a portion of the steam generated in the steam turbine is extracted and this steam is introduced into the blade. However, by only simply applying the air cooling model there are problems which have yet to be solved such as: how the steam is introduced into the stationary blade or the shroud, which portion of the stationary blade and the shroud are effectively cooled, what structure the cooling passage should have and how the steam should be collected.

OBJECTS OF THE INVENTION

Accordingly, in order to solve the above-described problems, a primary object of the present invention is to provide a gas turbine cooled stationary blade which is air cooled in the same manner as the conventional system, and which introduces steam to cool the blade and shrouds to considerably decrease the amount of cooling air to be used compared with the conventional amount, to reduce loads imposed on a compressor or a cooler, thereby enhancing the performance of the gas turbine and efficiently cooling the shrouds with the steam.

Another object of the present invention is to provide a gas turbine cooled stationary blade in which, when both the air cooling and steam cooling are performed, the cooling air which has a relatively high pressure is used for narrow portions where it is difficult for the steam to pass, and the steam is passed for cooling through the primary portion where the steam is easily passed, thereby enhancing the overall cooling efficiency.

Still another object of the present invention is to provide a gas turbine cooled stationary blade in which, when the above-described steam cooling is employed, the steam is recovered and returned to the steam feed source without any leakage to the outside of the blade.

Still another object of the present invention is to provide a cooled stationary blade for a gas turbine in which, in order to enhance the cooling efficiency, the paths for the introduction and discharge of the steam are improved by, for example, film-cooling the rear edge of the outer shroud or by using impingement plates within the outer and inner shrouds.

In order to attain these objects, the following means (1) to (7) are provided, respectively.

SUMMARY OF THE INVENTION (1) A cooled stationary blade assembly for a gas turbine according to the present invention comprises an outer shroud, an inner shroud, a blade disposed between the outer shroud and the inner shroud, and an air cooling means for cooling the blade. The blade is characterized in that a steam cooling means is provided for cooling the outer shroud, the inner shroud and the interior of the blade, and in that both steam cooling and air cooling are utilized by the steam cooling means and the air cooling means, respectively.

In the above-described invention (1), since the outer shroud, the inner shroud and the blade use not only air cooling but also steam introduction, it is possible to reduce the large amount of air conventionally consumed and to reduce the capacity of a compressor or a cooler. Also, in providing a combined cycle, in which a gas turbine and a steam turbine are combined with each other, since a portion of the steam is extracted from the steam turbine, the steam for cooling the stationary blade may be readily obtained so that the large amount of cooling air may be reduced to enhance the performance of the gas turbine. Furthermore, since the steam is also introduced into the shrouds, the cooling performance is enhanced.

(2) The cooled stationary blade assembly for a gas turbine according to the above-described invention (1) is further characterized in that the air cooling means is used for narrow portions where it is difficult for the cooling steam to pass, and the steam cooling means is used for primary portions where the cooling steam easily passes.

In the above-described invention (2), since the pressure of the cooling air is high compared to that of the cooling steam, it is possible to effectively cool the detailed portions which are difficult to cool.

(3) The cooled stationary blade assembly for a gas turbine according to the above-described invention (2) is also characterized in that the steam cooling means is steam passages and the air cooling means is air passages, the steam passages are provided in a central portion in the outer shroud and the inner shroud where the blade is located and in the interior of the blade, and the air passages are provided in peripheral portions of the inner and outer shrouds and a rear edge of the blade.

In the above-described invention (3), by making the respective means the passages, it is possible to effectively cool the outer and inner shrouds and the blade with the cooling steam and cooling air. Also, it is possible to perform effective cooling as a whole because the central portions of the outer and inner shrouds, which are primary portions of the stationary blade, and the front edge portion of the blade are cooled by the steam, and the cooling air having a relatively large pressure difference is used for the peripheral portions of the outer and inner shroud and the narrow passage portions at the rear edge of the blade where it is difficult for the steam to pass.

(4) The cooled stationary blade assembly for a gas turbine, according to the above-described invention (2) or (3) is characterized in that the steam used in the steam cooling means is introduced from the outer shroud and passes through an interior of the outer shroud and the steam passages communicated with the interior of the blade, and a portion of the steam is introduced into the inner shroud, flows upwardly through the interior of the blade and is recovered from a steam outlet of the outer shroud.

In the above-described invention (4), the steam is effectively utilized, and adverse effects such as leakage of the steam to the outside of the blade can be eliminated because the steam is introduced from the outer shroud to cool the outer shroud, the inner shroud and the interior of the blade, and then is recovered from the steam outlet provided in the outer shroud and returned to the steam feed source.

(5) The cooled stationary blade assembly for a gas turbine according to the above-described invention (1) is characterized in that the steam cooling means is constructed so that the interior of the outer shroud is divided by a rib into a steam introduction side and a steam discharge side.

In the above-described invention (5), the interior of the outer shroud is divided into the steam introduction side and the steam discharge side so it is possible to simplify the steam feed side and the stream recovery side and effectively perform cooling.

(6) The cooled stationary blade assembly for a gas turbine according to the above-described invention (1) is characterized in that film cooling holes for the air cooling means is provided at a rear edge side of the outer shroud.

In the above-described invention (6), since the film cooling holes are provided at the outer shroud rear edge, the cooling efficiency of the rear edge of the shroud by air cooling is enhanced.

(7) The cooled stationary blade assembly for a gas turbine according to the above-described inventions (1) to (4) is further characterized in that chambers, where the steam is stagnant, defining the steam cooling means are provided in the outer and inner shrouds, and that impingement plates are provided parallel to a bottom surface of each shroud midway in the chambers.

In the above-described invention (7), since the impingement plates are provided within the outer and inner shrouds, the steam is diffused uniformly, and the inner surface of the inner shroud may be impingement cooled.

DESCRIPTION OF THE PREFERRED EMBODIMENTS

An embodiment of the invention currently considered preferable and another embodiment that may be substituted therefor will now be described in detail with reference to the accompanying drawings. In the following description, the same reference numerals are used for like components throughout the drawings. Also, it is noted that in the following descriptions, the terms "right", "left", "upper" and "lower" are used for the sake of convenience, and these terms should not be interpreted in any limiting manner.

Embodiment 1

Figure 1:
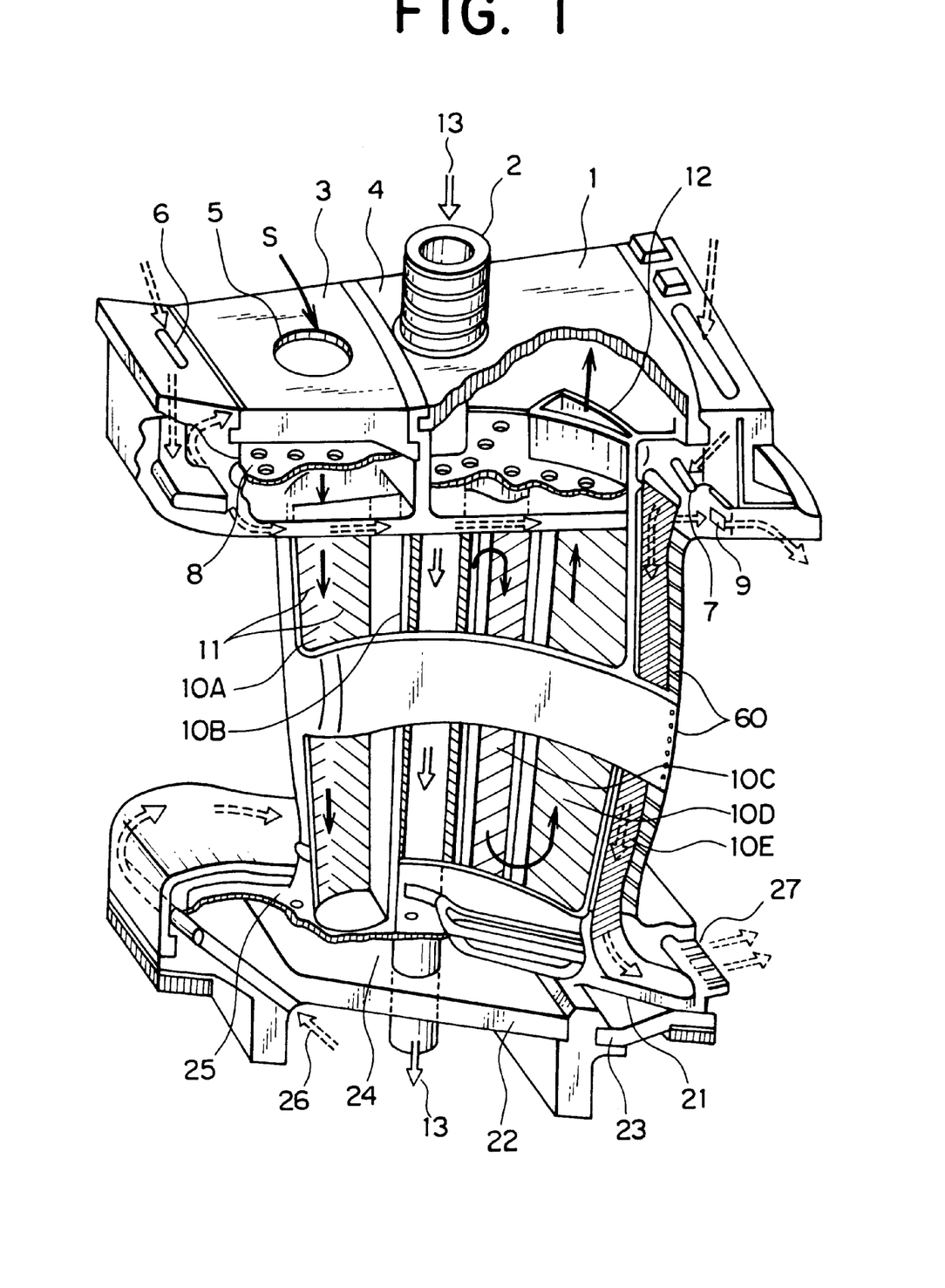
FIG. 1 is a perspective view showing a gas turbine cooled stationary blade in accordance with an embodiment of the present invention.
Figure 2:
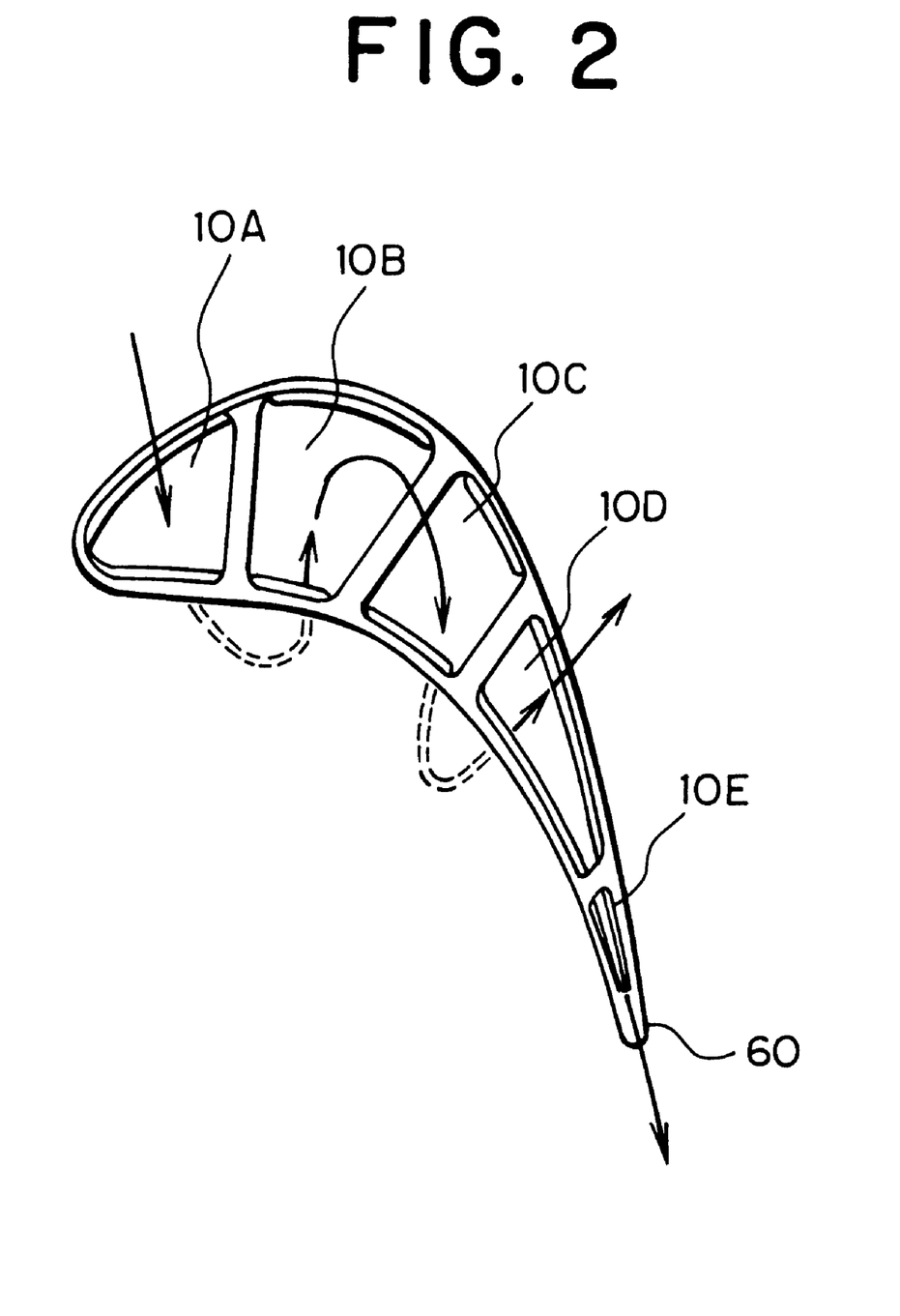
FIG. 2 is a cross-sectional view showing the cooled stationary blade shown in FIG. 1.

An embodiment of the present invention will now be described in detail with reference to the drawings. FIG. 1 is a perspective view showing a gas turbine cooled stationary blade in accordance with an embodiment of the present invention. FIG. 2 is a cross-sectional view thereof. In both drawings, numeral 1 denotes an outer shroud, an upper portion of which is covered by steam covers 3 and 4. An inlet end of a sealing air feed tube 2 is provided in the steam cover 4, and the tube 2 is provided to pass through the upper and lower portions of the blade. Numeral 5 denotes a steam feed port provided in the steam cover 3 for introducing the steam into the space below the steam covers 3 and 4. Numeral 6 denotes a cooling air feed port for feeding a cooling air to the lower peripheral portion of the outer shroud 1.

Reference numeral 7 also denotes a cooling air feed port for feeding the cooling air to the rear edge side of the blade. Numeral 8 denotes an impingement plate provided midway in the internal space of the outer shroud 1. This impingement plate has a number of holes for diffusing the steam introduced from the steam feed port 5 by impingement to keep the steam uniform and for injecting the steam from a number of holes to the lower portion to impingement cool the outer shroud. Numeral 9 denotes a cooling air passage. The cooling air is introduced into the outer peripheral portions of the outer shroud 1, passes through the periphery of the shroud, and is discharged from the rear edge side of the blade as indicated by dotted line arrows.

Characters 10A, 10B, 10C, and 10D denote cooling steam passages in the interior of the blade. Steam S is introduced from an upper portion of the passage 10A of the front edge portion. The lower portion of the passage 10A is communicated with the passage 10B. The upper portion of the passage 10B is communicated with the upper portion of the passage 10C. In a similar manner, the lower portion thereof is communicated with the passage 10D. The upper portion of the passage 10D is communicated with a steam outlet 12 to form a serpentine cooling system. Numeral 11 denotes turbulators provided in the inner walls of the respective passages 10A to 10D for making the steam flow passing therethrough turbulent to enhance heat transmission. Incidentally, a perpendicular turbulator that is perpendicular to the flow of the cooling steam is arranged on the front edge side of the blade, and an oblique turbulator is arranged on the rear side thereof.

Numeral 21 denotes an inner shroud. Numerals 22 and 23 denote the steam covers below the shroud. Numeral 24 denotes a steam sump at an upper portion of the steam cover 22. Numeral 25 denotes an impingement plate with a number of holes provided midway in the internal space of the inner shroud 21. The impingement plate 25 is used to direct a portion of the steam to be introduced into the steam sump 24 from the passage 10A toward the surface of the inner shroud 21 from the steam sump 24, thereby injecting the steam from a number of holes of the impingement plate 25 to impingement cool the inner shroud 21.

In the gas turbine cooled stationary blade with the above-described structure, the sealing air 13 is introduced from the sealing air feed tube 2 and introduced into the lower portion of the inner shroud 21 and directed into a cavity (not shown). The interior of the cavity is kept at a high pressure to seal it against the high temperature gas from the external combustion gas passage.

The steam is introduced from the steam feed port 5 to the outer shroud 1 as indicated by solid lines in FIGS. 1 and 2, impinges against the impingement plate 8, and is introduced through a number of holes to the blade lower portion of the blade of the shroud 1 to cool the lower portion uniformly. Thereafter, the cooling steam is introduced into the cooling steam passage 10A in the front edge portion of the blade and flows downwardly while cooling the front edge portion and is introduced into the next passage 10B. Here, a portion of the steam is introduced downwardly into the steam sump 24 of the inner shroud 21 and injected toward the inner shroud 21 through a number of holes in the impingement plate 25 to cool the lower portion of the blade of the inner shroud 21 uniformly and is recovered from the steam outlet port 12 together with the steam of the passage 10D. In particular, the perpendicular turbulators and the oblique turbulators within the passage 10A have a large cooling effect for the front edge side of the blade.

The steam introduced into the passage 10B is used to cool this portion as it flows upwardly, and is introduced into the next passage 10C from an upper portion of the passage 10B to flow into the passage 10D in a similar manner. The steam flows to a steam recovery passage (not shown) and is recovered from the steam outlet port 12 located above the passage 10D. Thus, the interior of the stationary blade and the portions, located at the blade in the outer shroud 1 and the inner shroud 21, are cooled. The steam is recovered and returned to the steam feed source again.

On the other hand, the cooling air is introduced into the outer shroud 1 through an air passage (not shown) from the cooling air feed port 6 of the outer shroud 1, passes through the air passage provided in the periphery of the outer shroud 1 and flows as indicated by dotted line arrows in FIG. 1 to cool the periphery of the outer shroud 1. The cooling air then passes through the air passage 9 and is blown out on the side opposite the cooling air feed port 6 of the outer shroud 1. In this way, the primary portions of the outer shroud 1 at the blade are cooled with the steam, and at the same time, the cooling air flows in the peripheral portions where it is difficult for the steam to pass. The narrow portions of the peripheral portions of the outer shroud 1 are cooled due to the pressure difference of the high pressure air.

Also, the cooling air is introduced from the cooling air feed port 26 of the inner shroud 21, and flows through the peripheral portions of the inner shroud 21 as indicated by the dotted line arrows, thereby cooling the peripheral portions of the inner shroud 21. The cooling air is discharged to the outside from the rear cooling air outlet port 27. Also, in the inner shroud 21, the lower surface on the blade side is cooled by the steam, and the peripheral portions where it is difficult for the steam to pass are cooled by the cooling air flowing in a similar manner as in the outer shroud 1.

Furthermore, the cooling air is introduced to the passage 10E at the rear edge of the blade from the cooling air feed port 7 and flows downward from the upper portion of the passage 10E. The cooling air is blown out of the rear edge holes 60 to cool the fin of the rear edge. The air remaining after cooling flows to the lower portion of the inner shroud 21. Thus, the cooling air passes through and cools the thin passage portions in the rear edge where it is difficult for the steam to pass.

Figure 3:
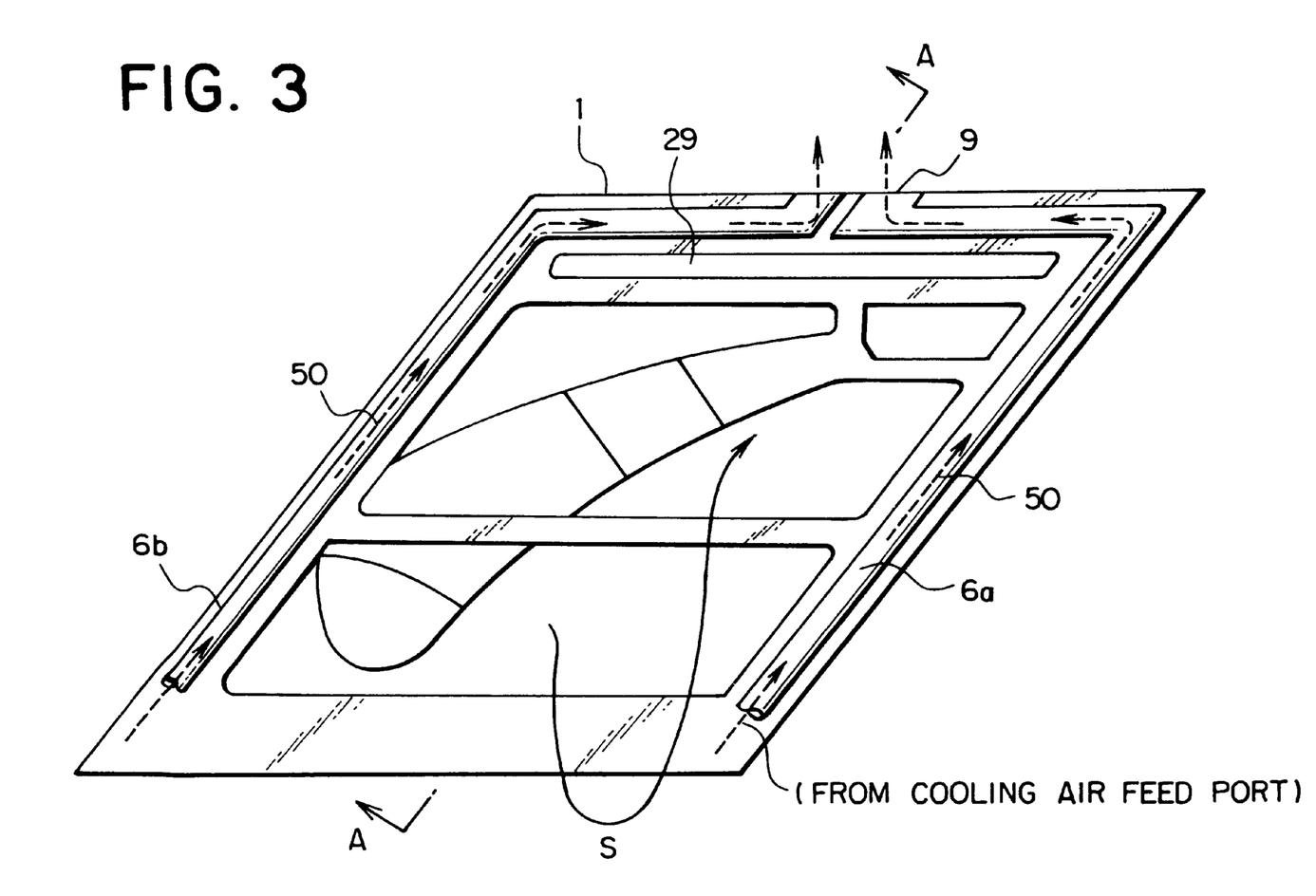
FIG. 3 is a plan view showing an outer shroud of a gas turbine cooled stationary blade in accordance with the embodiment of the present invention.

FIG. 3 is a plan view of the above-described outer shroud 1. The cooling air 50 introduced from the cooling air feed port 6 shown in FIG. 1 passes through air passages 6a and 6b on each side of the outer shroud to cool both end portions of the outer shroud, and is discharged from the air passages 9 (only one at each end portion in FIG. 3, but a number of passages may be provided as a whole) which are the film cooling holes on the rear edge side, thereby performing the film cooling. The cooling air fed from the cooling air feed port 7 shown in FIG. 1 is introduced into a slit 29 to enter the passage 10E at the rear edge. Also, the steam is fed from the steam feed port 5 as described above, and flows to the lower portions of the steam covers 3 and 4 to cool the inner surface of the outer shroud 1, and then the steam is recovered.

Figure 4:
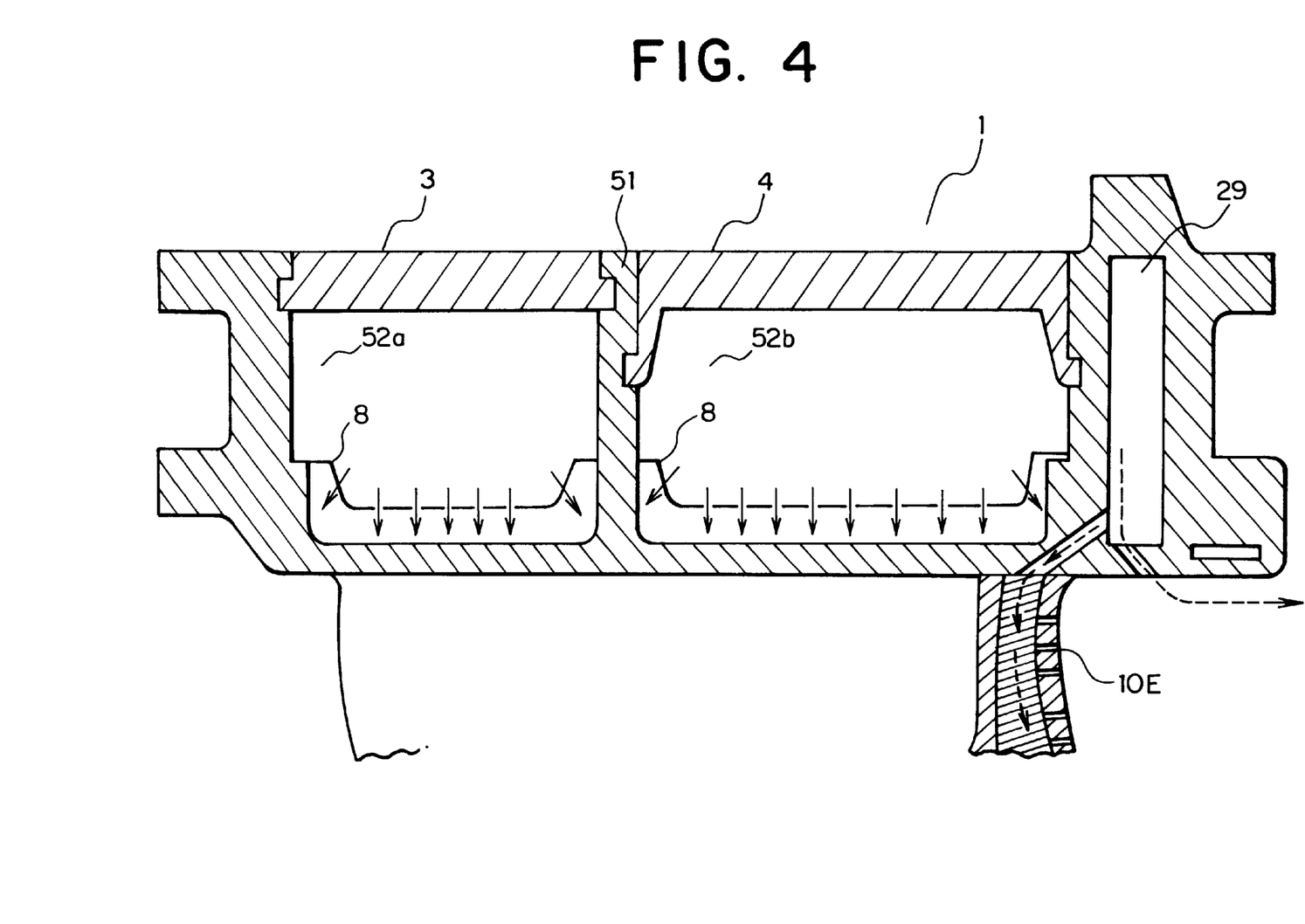
FIG. 4 is a cross-sectional view taken along the line A—A of FIG. 3.

FIG. 4 is a cross-sectional view taken along the line A—A of FIG. 3. As described above, steam chambers 52a and 52b are partitioned by the steam covers 3 and 4 and a rib 51. The steam is introduced from the steam chamber 52a, and introduced to the steam chamber 52b on the collection side through the interior of the blade. The steam introduced into the steam chambers 52a and 52b impinges on the impingement plate 8 and is injected to the lower portion of the chamber from a number of holes formed in the impingement plate 8 to cool the inner surface of the outer shroud uniformly. Also, cooling air is introduced into the passage 10E at the rear edge of the blade from the slit 29 as described above, and at the same time, a portion thereof is discharged from the air passage 9 to provide film cooling.

In the gas turbine cooled stationary blade in accordance with the above-described embodiment, the steam passes through the interior of the stationary blade, and the serpentine cooling system is formed by the passages 10A to 10D. Also, the turbulators 11 are provided in each passage to enhance the efficiency of the steam cooling. Further, in this system, the impingement plates 8 and 25 are also provided in the primary portions, located at the blade in the outer shroud 1 and the inner shroud 21, respectively, to impingement cool with the steam.

Also, in the system for cooling the narrow portions due to the pressure difference of the high pressure air, the cooling air passes through the peripheral portions of the outer shroud 1 and the inner shroud 21 where it is difficult for the steam to pass and the passage 10E on the rear edge fin side of the blade. Thus, both steam cooling and air cooling are utilized. Consequently, compared to the conventional air cooling system using only air cooling, it is possible to considerably reduce the amount of the cooling air and reduce the power for the compressor and the cooler, and therefore enhance the performance of the gas turbine.

The embodiment of the present invention, currently considered preferable, and another embodiment which may be substituted therefor have been described in detail with reference to the accompanying drawings. However, the present invention is not limited to these embodiments. Those skilled in the art readily understand that various modifications and additions to the gas turbine cooled stationary blade are included in the present invention without departing from the spirit and the scope of the present invention. Also, those skilled in the art may realize these modifications and additions without any difficulty.

What is claimed is:

1. A cooled stationary blade assembly for a gas turbine, comprising:

an outer shroud (1) having air feed ports at a front portion (6) and at a rear portion (7) of said outer shroud for cooling the interior of said outer shroud;

an inner shroud (21);

a blade disposed between said outer shroud (1) and said inner shroud (21);

air cooling means for cooling said blade; and steam cooling means for cooling said outer shroud, said inner shroud and an interior of said blade, and wherein both steam cooling and air cooling are utilized by said steam cooling means and said air cooling means, respectively.

2. The cooled stationary blade assembly for a gas turbine according to claim 1 characterized in that said air cooling means is used to cool peripheral portions of said stationary blade assembly where it is difficult for the cooling steam to pass, and said steam cooling means is used to cool main cavities of said stationary blade assembly where the cooling steam is easily passed.

3. The cooled stationary blade assembly for a gas turbine according to claim 2 characterized in that said steam cooling means comprises steam passages (10A to 10D), and said air cooling means comprises air passages (6a, 6b, 10E), wherein said steam passages are provided in a central portion of said outer shroud (1) and the inner shroud (21) and in the interior of said blade, and wherein said air passages are provided in peripheral portions of said inner and outer shrouds and a rear edge of said blade.

4. The cooled stationary blade assembly for a gas turbine according to claim 2 characterized in that the cooling steam (S) used in said steam cooling means is introduced from said outer shroud (1) and passes through an interior of said outer shroud to steam passages (10A to 10D) located in an interior of said blade, and a portion of the cooling steam from said steam passages is introduced into said inner shroud (21) and thereafter flows upwardly through the interior of said blade and is recovered from a steam outlet (12) of said outer shroud.

5. The cooled stationary blade assembly for a gas turbine according to claim 1 characterized in that said steam cooling means is constructed so that the interior of said outer shroud (1) is divided into a steam introduction side (52a) and a steam discharge side (52b) by a rib (51).

6. The cooled stationary blade assembly for a gas turbine according to claim 1 characterized in that a film cooling hole (9) for said air cooling means is provided on a rear edge side of said outer shroud (1).

7. The cooled stationary blade assembly for a gas turbine according to claim 1, wherein said steam cooling means further comprise chambers (52a, 52b, 24) in said outer shroud (1) and said inner shroud (21), and impingement plates (8, 25) provided parallel to a bottom surface of each shroud midway in said chambers.

* * * * *